US006365639B1

(12) United States Patent
Hoy

(10) Patent No.: US 6,365,639 B1
(45) Date of Patent: Apr. 2, 2002

(54) RHEOLOGY, MODIFIED COMPOSITIONS EXHIBITING STRESS-DEPENDENT FLUIDITY, MODIFICATION AGENTS THEREFOR, AND METHODS OF MAKING SAME

(76) Inventor: Edgar Franklin Hoy, 3906 Rock Springs Dr., Kingwood, TX (US) 77345

( * ) Notice: Subject to any disclaimer, the term of this patent is extended or adjusted under 35 U.S.C. 154(b) by 0 days.

(21) Appl. No.: 09/478,425

(22) Filed: Jan. 6, 2000

(51) Int. Cl.$^7$ .................. B01J 13/00; C01B 33/20; C01B 31/24; C09K 7/02
(52) U.S. Cl. .................. 516/110; 507/129; 507/131; 507/140; 507/239; 507/244; 507/269; 252/184; 423/420.2
(58) Field of Search .................. 516/110; 507/129, 507/131, 140, 239, 244, 269; 252/184; 423/420.2

(56) References Cited

U.S. PATENT DOCUMENTS

| | | | | |
|---|---|---|---|---|
| 3,948,809 A | * | 4/1976 | Norman et al. | 502/415 |
| 4,318,732 A | | 3/1982 | Sawyer, Jr. | 507/140 |
| 4,458,026 A | | 7/1984 | Reichle | 502/80 |
| 4,492,678 A | | 1/1985 | Yoo et al. | 423/244.09 |
| 4,580,633 A | * | 4/1986 | Watkins et al. | 507/244 |
| 4,656,156 A | * | 4/1987 | Misra | 502/415 |
| 4,664,843 A | | 5/1987 | Burba, III et al. | 516/110 |
| 4,748,139 A | | 5/1988 | Burba, III | 501/120 |
| 4,774,212 A | | 9/1988 | Drezdon | 502/62 |
| 4,790,954 A | | 12/1988 | Burba, III et al. | 516/110 |
| 4,904,457 A | * | 2/1990 | Misra | 423/115 |
| 4,935,146 A | | 6/1990 | O'Neill et al. | 210/684 |
| 4,990,268 A | | 2/1991 | Burba, III et al. | 507/108 |
| 5,036,915 A | * | 8/1991 | Wyganowski | 507/202 |
| 5,079,203 A | | 1/1992 | Pinnavaia et al. | 502/84 |
| 5,094,778 A | | 3/1992 | Burba, III et al. | 516/100 |
| 5,114,898 A | | 5/1992 | Pinnavaia et al. | 502/406 |
| 5,196,143 A | | 3/1993 | Burba, III et al. | 516/110 |
| 5,232,627 A | | 8/1993 | Burba, III et al. | 516/110 |
| 5,308,547 A | | 5/1994 | Burba, III et al. | 516/104 |
| 5,418,071 A | | 5/1995 | Satou et al. | 428/552 |
| 5,418,271 A | | 5/1995 | Burba, III et al. | 524/436 |
| 5,443,761 A | | 8/1995 | Burba, III et al. | 516/22 |
| 5,645,810 A | | 7/1997 | Easley | 423/600 |
| 5,663,122 A | | 9/1997 | Mueller et al. | 507/140 |
| 5,721,198 A | | 2/1998 | Burba, III et al. | 507/140 |
| 5,723,698 A | * | 3/1998 | Dai et al. | 568/913 |
| 5,728,363 A | * | 3/1998 | Martin et al. | 423/593 |
| 5,955,048 A | | 9/1999 | Cedro, III et al. | 423/306 |
| 6,025,303 A | | 2/2000 | Keilhofer et al. | 507/140 |

FOREIGN PATENT DOCUMENTS

WO  WO 92/18238  10/1992

OTHER PUBLICATIONS

"Reaction of mixed magnesium–aluminum and calcium–aluminum hydroxides with Wyoming bentonite," Clark, J.S. et al., Canadian Journal of Earth Science, vol. 6, 47–53 (1969) Month unknown.

"The distribution constant for exchange of calcium and magnesium in Wyoming bentonite," Clark, J.S. et al., Canadian Journal of Soil Science, vol. 46, 271–280 (1996) Month unknown.

"Formation of double hydroxides and the titration of clays," Turner, R.C. et al., Science, vol. 136, 1052–1054 (1962) Month unknown.

J. Plank et al., "MMH–bentonite fluids provide outstanding performance in oil field drilling," Oil & Gas Journal, pp. 39–42 (Mar. 13, 2000).

"The Nature of the Thermal Decomposition of a Catalytically Active Anionic Clay Mineral," Reichle et al., J. Catalysis 101, 352–359 (1986) Month unknown.

* cited by examiner

Primary Examiner—Daniel S. Metzmaier
(74) Attorney, Agent, or Firm—Barbara J. Tribble

(57) ABSTRACT

A method of making a rheology modified aqueous composition, particularly useful for drilling, milling and mining applications, is disclosed. The method includes admixing, with a clay and water, a material or materials whose constituents substantially conform to the proportions of the empirical formula $M'_m M''_n (OH)_{(2m+3n+qa+br)} (A^q)_a (B^r)_b \cdot xH_2O$, where M' represents at least one divalent metal cation and m is an amount of from greater than zero to about 8; where M" represents at least one trivalent metal cation and n is an amount of from greater than zero to about 6; where A is an anion or negative-valence radical that is monovalent or polyvalent, and a is an amount of A ions of valence q, provided that if A is monovalent, a is from greater than zero to about 6, and if A is polyvalent, a is from greater than zero to about 3; where B is a second anion or negative-valence radical that is monovalent or polyvalent, and where b is an amount of B ions of valence r and b is from zero to about 1; provided qa+br cannot be greater than 2m+3n, and provided that qa cannot equal 2m+3n; further provided that (2m+3n+qa+br) is less than 3; and where $xH_2O$ represents excess waters of hydration, with x being zero or more. Calcined hydrotalcite and hydrotalcite-like materials are particularly preferred as starting materials. Optionally, an aluminum oxide, a nitrogen-containing compound, or both may be added. The resulting composition is preferably an elastic solid exhibiting stress-dependent fluidity, desirable temperature resistance, lubricity, inhibition of reactivity, relatively low cost, and pressure resistance. A dry composition and method of making are also disclosed.

18 Claims, No Drawings

RHEOLOGY, MODIFIED COMPOSITIONS EXHIBITING STRESS-DEPENDENT FLUIDITY, MODIFICATION AGENTS THEREFOR, AND METHODS OF MAKING SAME

FIELD OF THE INVENTION

This invention relates to the field of rheology modification agents for use in water or water-based fluids, and more particularly to the preparation of compositions exhibiting stress-dependent fluidity and agents useful for preparing such compositions.

BACKGROUND OF THE INVENTION

The use of rheology modification agents, frequently thickening agents, for aqueous and hydrophylic fluids has been common practice in a large number of industries. These fluids include, for example, oil field drilling fluids, metalworking fluids, mining fluids, fire control fluids, hydraulic fluids, water-based paints and coating fluids, stripping fluids, and the like. For each of these, and other, applications, the rheology modification agents serve very specific purposes tailored to the function for which the fluid is being employed. Among these purposes are pressure resistance; suspension of solids; adjustment of reaction time(s); protection against temperature extremes or variations; durability and resistance to degradation under conditions of use; protection from undesirable external forces such as bacterial attack, oxidation, or chemical reaction such as corrosion; and the like. Because a variety of properties are frequently needed for a given fluid, the rheology modification agent has frequently been used in conjunction with other types of agents or additives, in order to produce a final fluid suitable to a given application. However, since it is generally desirable to reduce the number of such agents or additives as much as possible, in order to facilitate the ease of production and use and therefore to also minimize cost, it is desirable to employ a rheology modification agent which offers the greatest number of benefits to the fluid for its intended use.

A variety of general rheology modification agents are known and have been qualified for use in various specific applications. For example, polymeric materials such as xanthan gum, guar gum and polyacrylamides have historically been used as rheology modification agents in water-based drilling fluids, but have been found to be unstable in the presence of various salts encountered in some formations and in subsea drillsites. These materials also tend to exhibit undesirable susceptibility to oxidation and bacterial attack; to degradation when exposed to the shear forces exerted in the drilling process; and/or to thermal degradation above about 250 to 300° F. They also have limited ability to maintain solids suspension upon elimination of shear forces such as those produced during pumping.

Showing better thermal stability are some of the non-polymeric materials, typically clays such as bentonite and attapulgite. For example, bentonite is relatively stable to temperature and offers the additional benefits of resistance oxidation and durability when exposed to high shear conditions. These mineral clays are often used with other types of agents or densifiers, such as iron oxide or barium sulfate, which enhance the ability of the fluid to resist pressures such as are encountered in subterranean excavations.

Unfortunately, the mineral clays, though historically popular, are not without their drawbacks for many applications. Fluids containing bentonite, though probably the most popular of the clay materials for drilling muds, are severely compromised in the presence of polyvalent cations, such as calcium and magnesium, frequently present in drilling formations, and may become so thick at higher temperatures under some circumstances that thinners must frequently be added. Other clay systems also suffer from undesirable reactivity and temperature degradation, and may not be adequately consistent in composition from batch to batch.

Combinations of clays and polymeric materials have also been employed, with the goal of extending the clay and thereby using less of it. Thus, the complexity of the composition is increased and therefore its cost and/or difficulty of preparation, particularly under field conditions. Typical extenders useful with bentonite systems include polyacrylamide. Unfortunately, the weaknesses of the extending polymer, such as thermal instability and the like, may then dominate the characteristics of the fluid as a whole.

In response to the above-cited problems, those skilled in the art have developed a number of newer agents based on hydrous aluminum compounds. In many cases the hydrous aluminum compounds must be formed in situ. This method of preparation results in formation of relatively large amounts of reaction salts which may then cause corrosion of metals such as drill bits, or may undesirably interfere with other performance additives. Furthermore, control of the reaction for in situ preparation may be extremely difficult depending upon the final application, for example, in the mud pit of a drilling rig.

Also used with some success for rheology modification are crystalline layered mixed metal hydroxides, wherein Li, Mg, Cu, Zn, Mn, Fe, Co, and Ni are part of the layered structure; and also other metal aluminates. Of particular note are the "gelling" materials disclosed in U.S. Pat. Nos. 4,664,843 and 4,790,954, which disclose agents that exhibit not only thickening in general, but also a variable rheology defined as "pseudoplasticity". Such rheology is characterized by an ability to flow, to a determinable extent, upon exertion of a given shear force, such as that exerted by an actively revolving drill bit or during pumping from or into the mud pit of a drilling rig. The treated fluid then returns to a significantly higher, and again determinable, viscosity when the shear force is removed. These newer rheology modification agents thus are particularly well-suited to solids suspension combined with ease of use. However, in many cases they still suffer from some of the problems associated with the polymeric, clay and combination agents, such as limited inhibition of reactivity with some cations, undesirable toxicity, temperature limitations, insufficient lubricity, and the like. In particular, many of these agents are extremely expensive and thus impractical for drilling-scale applications in particular.

It would therefore be highly useful in the field to identify a family of agents which impart rheology modification to aqueous systems, such that their viscosity levels, with or without application of shear forces, can be optimized at each point in time according to the desired application; which exhibit desirable temperature resistance, lubricity, inhibition of reactivity, and resistance to geological formation pressure; and which are not cost-prohibitive for large scale application.

BRIEF SUMMARY OF THE INVENTION

The present invention provides such a family of agents and rheology modified aqueous compositions. It includes a method of making a rheology-modified aqueous composition comprising admixing a material or materials whose constituents substantially conforming to the proportions of the empirical formula $$M'_m M''_n (OH)_{(2m+3n+qa+br)} (A^q)_a (B^r)_b \cdot xH_2O,$$

where M' represents at least one divalent metal cation and m is an amount of from greater than zero to about 8; where M" represents at least one trivalent metal cation and n is an amount of from greater than zero to about 6; where A is an anion or negative-valence radical that is monovalent or polyvalent, and a is an amount of A ions of valence q, provided that if A is monovalent, a is from greater than zero to about 6, and if A is polyvalent, a is from greater than zero to about 3; where B is a second anion or negative-valence radical that is monovalent or polyvalent, and where b is an amount of B ions of valence r and b is from zero to about 1; provided qa+br cannot be greater than 2m+3n, and provided that qa cannot equal 2m+3n; further provided that (2m+3n+qa+br) is less than 3; and where $xH_2O$ represents excess waters of hydration, with x being zero or more; with at least a clay and water to form a rheology-modified aqueous composition.

The present invention further includes a method of making a rheology-modified aqueous composition comprising calcining a hydrotalcite and admixing therewith at least a clay and water. The invention also comprises a dry composition useful for rheology modification of aqueous fluids comprising a calcined hydrotalcite and a clay, and a method of making such composition.

Finally, the present invention still further includes rheology modified aqueous composition useful for subterranean excavation comprising a calcined hydrotalcite, a clay, water and, optionally, an aluminum oxide, a nitrogen-containing compound, or both, and a method of making such composition.

Such aqueous compositions preferably exhibit a stress-dependent fluidity, as defined hereinbelow, which makes them particularly, though not solely, suitable for use as a drilling fluid, milling fluid, or mining fluid. These compositions can be prepared neat or in situ and preferably also exhibit desirable solids suspension capability; desirable inhibition, as shown by incidence of corrosivity and other reactions; low toxicity; and excellent thermal stability; when compared with other known rheology modification agents. They are also generally not prohibitively expensive for large scale applications.

DETAILED DESCRIPTION OF THE INVENTION

The present invention provides a novel family of compositions which can be classified generally as dry rheology modification agents useful in water and water-based fluids of many types, and the fluids themselves as modified by the agents. Because the precise nature of the chemical structures resulting in the presence of water is subject to hypothesis, the fluid compositions are defined herein via their method of production; nonetheless, it is stressed that the resulting rheology modification cannot be explained as a result of known physical chemistry interactions, such as those which are characteristic of thixotropic, Newtonian, non-Newtonian, pseudoplastic, dilatant, Bingham plastic, or rheopexic behavior. The rheology modification exhibited by the aqueous compositions herein are therefore described simply as providing "stress-dependent fluidity", which means that the compositions in unstressed state form an elastic solid which then is fluidized to form a true fluid (not plastic flow or plastic deformation) under stress. Flow of the fluid along or over a substrate is then measurable and can be defined by one or more of the normal descriptions of fluid flow, including plug flow, turbulent flow, laminar flow and so forth. Stresses inducing such flow are desirably primarily mechanical in nature, such as the application of shear forces exerted during drilling, mining, and milling processes, and the like, and thus the term "stress-dependent fluidity" as applied herein does not refer to fluidization which may result in some compositions due to increases in temperature. In fact, since many of the applications for which the compositions of the present invention may be applicable are at relatively high temperatures (preferably more than 200° F., more preferably more than 300° F., and most preferably more than 400° F.), it is preferable that the compositions exhibit stress-dependent fluidity that is based upon mechanical stresses only.

"Stress-dependent fluidity" also requires that the phase change, from elastic solid to true fluid, be fully reversible, ensuring that the elastic solid nature of the material is reinitiated as rapidly as possible upon cessation of the mechanical stress, and that the physical shape of the elastic solid precisely imitate the physical shape of the fluid just prior to reinitiation. This ability to "gel", using the term colloquially and without reference to the precise nature of the chemical and/or ionic bonding and/or composition of the material, rapidly is particularly important in applications such as drilling and mining, where solids suspension is critical in maintaining the integrity of the excavation during work stoppages and where pumpability must be easily reinitiated in order to ensure restarts. Those skilled in the art will understand that the term "drilling" is used herein in its broadest meaning, to include not only the field of exploitation of geological deposits such as petroleum and/or natural gas, but also any technical accessory drilling, including but not limited to tunneling, so-called "river crossing", the sealing of dump sites, water well drilling, construction applications in general, and the like.

A key starting material for the present invention is a material which conforms substantially to the empirical formula $$M'_m M''_n (OH)_{(2m+3n+qa+br)} (A^q)_a (B^r)_b \cdot xH_2O$$

as defined in the Summary section of this application. Alternatively, a combination of materials which can contribute the proportions of constituents of the above empirical formula can be employed. While M' can represent any divalent metal cation of the Groups IIA, VIIB, VIII, IB or IIB of the Periodic Table, preferred divalent cations are Mg, Ca, Mn, Fe, Co, Ni, Cu, and Zn, and more preferred are Mg and Ca. M" is a trivalent metal cation selected from Groups IIIA or VIII, but preferred are Al, Ga and Fe, and more preferred is Al.

There must also be present at least one anion or negative-valence radical, A, and in some cases one (or more) additional anions or negative-valence radicals, B, may also be present. Examples of these anions and negative-valence radicals include carbonate, amines, amides, chlorides, oxides, and the like. Preferred therefor are carbonates, oxides and amides.

In selecting this first required material or combination of materials, such that the proportions of constituents substantially conform to the given empirical formula, it will be seen that it is particularly convenient to select a hydrotalcite or "hydrotalcite-like" compound, or a mixture thereof. Hydrotalcite itself has the chemical formula $Mg_6Al_2(CO_3)(OH)_{16} \cdot 4(H_2O)$. However, varying proportions of each of these constituents (Mg, Al, and the anions $CO_3$ and OH) characterize related natural and synthetic minerals within the empirical formula used in the broadest claim hereinbelow, and are thus considered to be "hydrotalcite-like" compounds. Such compounds may also be selected for use in the present invention. One possible source for such hydrotalcite and "hydrotalcite-like" compounds is, interestingly, waste streams from bauxite processing, which may include each of the constituents of the empirical formula in various forms, such as MgO, $Al_2O_3$ and its hydrates, $Mg(OH)_2$ and its hydrates, $Na_2(CO_3)_2$ and its hydrates, $Ca(OH)_2$, $Fe(OH)_2$ and its hydrates, hydrotalcite itself and its hydrates, and various cellulosics. An example of this waste-stream material is sold by Alcoa Corporation under the tradename denomination "HTC-GL". This product, which is characterized by the manufacturer as a "green liquor", is preferably "unwashed". This means that most or substantially all of soluble materials which are not included in the hydrotalcite formula (for example, Na and cellulosics) are still present, along with the constituents that are included in that formula.

Once a material source or sources for the constituents of the empirical formula has been selected, it is particularly desirable to calcine the material or materials. This calcination, which is heating sufficiently to drive off essentially all water of hydration and also to significantly alter any crystal structure involving atoms of the empirical formula, but to a point less than fusion. For example, in the case of hydrotalcite, this means that the calcination is carried out to a point less than, i.e., prior to, formation of spinel, which is essentially fused $MgAl_2O_4$ and therefore highly inert. Without wishing to be bound by any one theory as to the effect of calcination, it is hypothesized that, in the case of hydrotalcite and hydrotalcite-like materials, particularly as comprised in the Alcoa HTC-GL ("unwashed") product, the calcination process, which occurs at an inherently basic pH, brings about a series of reactions that include dehydration, but which also go beyond simple dehydration to include changes in the crystallography and/or orientation of certain components, and possibly actually collapse of certain crystal structures such that unit sizes (a-spacings) may be significantly reduced when compared with otherwise identical but uncalcined material.

This is in marked contrast with what has been termed in the field of minerals and inorganic chemistry as "activation" of metal hydroxides and hydrous metal oxides, sometimes in the presence of $CO_2$, to produce arid, friable (easily decrepitated) small crystals of colloidal size. This "activation" process has been defined in the literature as involving a significantly lesser degree of heating, presumably only to a point of removal of excess waters of hydration. See, for example, U.S. Pat. No. 5,232,627 in which heating above about 700° C. for hydrotalcite is proscribed on the basis that higher temperatures go beyond thermal dehydration and therefore fail to "activate" the material. Comparative Examples B and C hereinbelow confirm that finding and illustrate the inefficacy of some calcined hydrotalcites. It is hypothesized that calcination of these materials results in replacement of all of the hydroxyl constituency by an oxide constituent. Such compositions are, by definition, outside of the scope of the present invention as defined by its broadest claim, wherein it is provided that qa cannot equal 2m+3n. U.S. Pat. No. 4,748,139 also discloses formation of dense and inert spinel structures at temperatures above about 1000° C.

The calcination step of the present invention is carried out by heating to a temperature preferably from about 750° C., more preferably from about 900° C., to about 1500° C., more preferably about 1100° C. Most preferably heating is carried out at a temperature of about 1000° C. Such heat can be supplied by any means standard in the art, e.g., a rotary kiln, and is preferably carried out for a period of time sufficient to result in a rheology modified composition when the calcined material(s) is(are) mixed with clay and water. In most instances this requires at least about 60 minutes at about 750° C.; preferably at least about 30 minutes at about 850° C.; and more preferably at least about 15 minutes at about 1000° C. Time and temperature are preferably balanced to bring about the desired result, with higher temperatures obviously requiring less time. A ramping process is desirable and easily effected in a rotary kiln, with a suggested total ramp time to 1000° C. of at least about 45 minutes, including a cooldown period to lower the product temperature to about 500° C.

It will be obvious to those skilled in the art that this calcination step may not be necessary in some cases, provided the constituents and proportions as defined in the empirical formula are present. However, when a material such as a hydrotalcite or a hydrotalcite-like material is employed in the present invention, such calcination step is preferred to produce a rheology modification agent which is generally more efficient. The calcination step is still more preferred when a combination material, such as the Alcoa HTC-GL (unwashed) or a similar material, is employed. It is noteworthy that the additional constituents present in the unwashed material, beyond hydrotalcite as defined formulaically, prevent the term qa in the formula of the broadest claim hereinbelow from equaling 2m+3n after calcination, and also ensure conformation with the claim's other requirements.

In preparing the dry rheology modification agents of the present invention it is preferable to combine the material or materials, whose constituents substantially conform to the empirical formula, with a clay. The clay is preferably a smectitic clay of any type, with preferred clays including bentonite, chlorite, polygorskite, saconite, vermiculite, halloysite, sepiolite, illite, kaolinite, attapulgite, montmorillonite, Fuller's earth, mixtures thereof, and the like. "Beneficiated" clays, which have been chemically altered by addition of an organic polymer or a sodium compound, of any of the above types are also useful. The selected clay component is combined via mixing with the defined material or materials to form a dry composition which is particularly suitable for shipping and storage.

In another embodiment the dry composition is combined with water to form a rheology modified aqueous composition. This composition may itself serve as a rheology modification agent, to be added to more water to form a final, useful rheology modified aqueous composition; or the dry composition may be added to the total amount of desired water directly to form such final composition.

Additional components may also be added, to either the dry composition or to the fluid composition. Such additional components most preferably include at least an aluminum oxide, a nitrogen-based compound, or a combination thereof. These additional components preferably serve to increase the temperature resistance of the final rheology modified aqueous composition, which is particularly desirable for applications such as drilling, milling and mining. It is preferred that the final rheology modified composition have a temperature resistance based upon a desired application, but those skilled in the art will be able to balance the amount of these additional additives to achieve a given temperature stability, which is defined as the range of temperature within which the desired phase transformations, defined as stress-dependent fluidity, are not disrupted and undesired degradation of the composition as a whole does not occur. With appropriate amounts of one or both of these additives, it is possible to achieve a temperature stability of the rheology modified aqueous composition of up to at least about 300° F., more preferably about 400° F., and most preferably about 450° F.

It is preferred that, if an aluminum oxide is added, it is selected from either crystalline forms, such as boehmite or gybsite (also called aluminum trihydroxide), or amorphous forms, such as those exhibiting either chi or rho orientation. This aluminum oxide component is preferably present in an amount of from at least about 5 weight percents, more preferably from about 10 weight percent, most preferably from about 15 weight percent, to about 35 weight percent, more preferably to about 25 weight percent, based on weight of the dry formulation. If the nitrogen-containing compound is employed, it is preferred that it be water-soluble and present in an amount of from about 10, more preferably from about 30, most preferalby from about 35, to about 60, more preferably to about 55, weight percent based on the dry formulation. The nitrogen-containing compound may be selected from any compounds of that description, including, for example, urea, propionamide, acetylamide, thiourea, mixtures thereof, and the like. In general, greater chain length materials, and excessive amounts of this additive, may disrupt the ability of the agent to produce the desired thickening in an aqueous system, and some materials, such as acetylamide, may present toxicity problems. Urea is preferred due to its short chain length, easy availability and low cost. It is further noted that the preferred amounts described here would be preferably doubled if the given additive is measured as weight percent of the material or materials whose total constituency conforms to the given empirical formula, which is to say that it is preferred that that material, which is preferably a calcined hydrotalcite or hydrotalcite-like material, preferably constitutes from about 40 to about 60, more preferably about 50, weight percent of the total dry composition. It is more preferred that both the aluminum oxide and the nitrogen-containing compound be included in the composition.

It is also possible to add additional, primarily basic, compounds, such as caustic or sodium carbonate, which tend to reduce the "onset" time prior to the initial maximization of viscosity, i.e., between mixing and the formation of the elastic solid. Such addition of "onset promoters" may not be needed if the aqueous fluid is already sufficiently basic. Such may be the case when the Alcoa HTC-GL unwashed product or other combinations of materials of relatively high pH are employed. It is preferable that the pH of the final product be from about 9 to about 14, more preferably from about 10 to about 11. However, it has been noted in the present invention that its rheological characteristics may be maintained even at very low pH, in some cases to as low as about 3, which makes it particularly desirable for use in low pH geological formations.

Other additives which may be useful in rheology modified aqueous compositions of the present invention include weighting agents, such as calcium carbonate, barium sulfate, and/or magnetite ($Fe_3O_4$); fluid loss control agents, such as starches and carboxymethylated starches; lubricity agents, such as glycol and glycerine; reaction inhibition agents, such as soluble potassium salts including potassium chloride and potassium acetate; and the like.

Water is also clearly necessary to form the rheology modified aqueous compositions of the present invention. Deionized or distilled water are strongly preferred, to limit the occurrence of undesirable side reactions. Its order in mixing is not critical but in some cases may affect the desired efficiency of the rheology modification. It is thus possible to combine, in dry form, the formula-defined material or materials with the clay and, optionally, other materials such as the aluminum oxide and/or nitrogen-containing compound as well as additional agents tailored to provide the desired range of properties of the final composition, and then add the resultant dry composition to the water; or to add either the formula-defined material or the clay to the water first and then add the other dry constituents in any order thereafter. A particularly preferred order is to combine the clay and water first, adjust the pH to the desired range of from about 9.0 to about 10.5, preferably by addition of a base such as sodium carbonate, and then add the formula-defined material thereto. It may be desirable in some cases to limit time of exposure of the dry composition, and/or of any dry components thereof, to air due to the inherently hygroscopic nature of some of the components, for example, the hydrotalcite and hydrotalcite-like materials. For some applications, e.g., in drilling rig mud pits, it is preferred to combine the clay and water first and then add the formula-defined material and other additives thereafter. Optimization of mixing via any known mechanical means, including for example use of impeller devices, rotational mixing, or other inducement of turbulence, is desirable to ensure consistency in performance.

Regardless of mixing order, the proportions of the three main components of the rheology modified aqueous compositions are most conveniently calculated based upon their ratios and upon their weight percentage in the water or aqueous fluid as a whole. It is preferred that the ratio of clay to the formula-defined component, e.g., a calcined hydrotalcite or hydrotalcite-like material, range from about 999:1 to about 5:1, more preferably from about 99:1 to about 9:1. Thus, the clay is preferably present in any concentration which increases the viscosity of the aqueous fluid, preferably from about 0.20, more preferably from about 2.0 weight percent, preferably to about 45.0, more preferably to about 30.0, weight percent, based upon the weight of the final rheology modified aqueous composition.

In partial summary, it will be noted that, because of the variety of mixing options represented hereinabove, it is possible to prepare a fully dry composition, suitable for shipping, storage and/or later hydration; a liquid composition, particularly suited to small scale batching; or a liquid composition prepared in situ, such as would be encountered when either the fully dry composition or small scale liquid composition is added to a much larger liquid environment, such as that encountered in a drilling rig mud pit. The final result, using any of these compositions, will be a viscosified aqueous composition which can be used at a wide variety of temperatures. Of particular importance is the fact that these compositions can be used in drilled wells having temperatures ranging from preferably about 45° F., more preferably about 70° F., to about 450° F., more preferably about 350° F. In addition to their thermal stability and predetermined maximum viscosity, which is preferably the "gelled" elastic solid phase, they also preferably exhibit excellent stress-dependent fluidity. In general, the reduction in viscosity upon stress application, also referred to as "shear-thinning", can be graphically predicted, with the relationship between viscosity (defined in centipoise) being substantially linear when plotted against shear rate (defined as $sec^{-1}$, which is a log scale). Finally, under conditions of actual use the phase transition from elastic solid to true fluid under shear conditions is rapid, preferably within about 2 minutes, more preferably effectively instantaneous, and the return to the elastic solid, or "gelled" state, occurs preferably within about 10 minutes, more preferably within about 5 minutes, and most preferably within about 0.5 minute. This last quality enables the composition to suspend drill, mill and mining solids particularly well upon cessation of shear forces such as those exerted by drill bits or during pumping. The resultant composition is furthermore preferably durable, exhibiting no or reduced reduction in its ability to make such rapid viscosity transitions upon intermittent and repeated applications of shear and in a wide variety of environments, including cation-rich environments.

These and other properties of the present invention will be further illustrated via the following examples, which are meant to be for illustrative purposes only and not meant to limit, nor should they be construed as limiting, the scope of the invention in any way.

EXAMPLE 1

A quantity of Alcoa Corporation's "HTC-GL", described by the manufacturer as a green liquor ("unwashed") hydrotalcite slurry, is ramp-calcined in a rotary kiln to a temperature of about 1000° C., with the maximum temperature maintained for about 15 minutes and a total ramp time of about 45 minutes. About 0.43 g of this material is mixed with about 350 g of an aqueous 2.0 weight percent sodium bentonite clay dispersion. Mixing is carried out using a Hamilton Beach mixer for about 2 minutes, and then 0.15 g of sodium carbonate is added, along with a sufficient amount of a 30 percent by weight aqueous sodium hydroxide solution, to raise the fluid pH to about 10.5. The resulting composition thickens virtually immediately and shear is continued for about 10 minutes thereafter.

The composition's rheological and fluid loss properties are tested using standard methodology as described in detail in *Manual of Drilling Fluids Technology*, 1985, NL Baroid/ NL Industries Inc., with the following results:

| Yield Point | 195 |
| Plastic Viscosity | 20 |
| 6 RPM* Reading | 96 |
| 3 RPM Reading | 72 |

*RPM means revolutions per minute.

The fluid loss properties of the composition are tested by placing about 300 ml of it in a standard fluid loss testing apparatus and pressurizing to 100 psig. The discharge fluid is collected for about 30 minutes and found to total greater than 40 ml.

EXAMPLE 2

A composition is prepared according to Example 1, except that following its preparation the composition is heated to about 200° F. for about 40 hours. The composition is then allowed to cool to about 80° F. and is then tested as in Example 1, with the following results:

| Yield Point | 135 |
| Plastic Viscosity | 10 |
| 6 RPM Reading | 80 |
| 3 RPM Reading | 65 |

EXAMPLE 3

A mixture is prepared according to Example 1, except that following its thickening, about 4 g of "Starpack II", a carboxymethylated starch fluid loss control agent sold by Chemstar Corporation, is added. The composition is then allowed to shear for the additional 10 minutes, as in Example 1, and then tested with the following results:

| Yield Point | 69 |
| Plastic Viscosity | 17 |
| 6 RPM Reading | 68 |
| 3 RPM Reading | 65 |

EXAMPLE 4

About 0.45 g of Alcoa Corporation's "unwashed" HTC-GL product, calcined as described in Example 1, is prepared and mixed with about 0.15 g of aluminum oxide hydroxide (AlO(OH)). The resulting admixture (about 0.60 g total) is then added to about 350 g of an aqueous 2.0 weight percent sodium bentonite clay dispersion and mixed on a Hamilton Beach mixer for about 2 minutes. About 0.15 g of sodium carbonate is then added, and also a sufficient amount of a 30 percent by weight sodium hydroxide solution to adjust the pH of the composition to about 10.5. At this point the composition thickens almost immediately and is then allowed to shear for an additional 10 minutes. The composition's rheological properties are then tested as in Example 1 with the following results:.

| Yield Point | 145 |
| Plastic Viscosity | 17 |
| 6 RPM Reading | 65 |
| 3 RPM Reading | 60 |

The composition's fluid loss properties are also tested as described in Example 1. The discharge fluid is collected for about thirty minutes and the total is found to be greater than about 40 ml.

EXAMPLE 5

A composition is prepared according to Example 4, and the final composition is then heated to 250° F. for 40 hours. The composition is then allowed to cool to about 80° F. Its rheological properties are then tested with the following results:

| Yield Point | 105 |
| Plastic Viscosity | 9 |
| 6 RPM Reading | 28 |
| 3 RPM Reading | 25 |

EXAMPLE 6

A composition is prepared according to Example 1, except that about 0.45 g of the calcined ("unwashed") HTC-GL is mixed with about 0.215 g of aluminum oxide hydroxide are used. Additionally, about 0.215 g of urea is mixed with the aluminum oxide hydroxide prior to incorporation with the aqueous sodium bentonite clay dispersion. Testing upon completion of the composition yields the following results:

| | |
|---|---|
| Yield Point | 175 |
| Plastic Viscosity | 18 |
| 6 RPM Reading | 78 |
| 3 RPM Reading | 72 |

EXAMPLE 7

A composition is prepared as in Example 6. Following completion of preparation it is then heated to about 400° F. for about 40 hours, and is then allowed to cool to about 80° F. Tested yields the following results:

| | |
|---|---|
| Yield Point | 74 |
| Plastic Viscosity | 9 |
| 6 RPM Reading | 54 |
| 3 RPM Reading | 50 |

EXAMPLE 8

A drilling mud is prepared by mixing about 0.43 lb of calcined HTC-GL ("unwashed") material, calcined as described in Example 1; 7 lb of sodium bentonite clay; and deionized water to make 1 barrel. About 0.15 lb of a mixture of sodium carbonate and 0.04 lb of a 30 weight percent sodium hydroxide solution are then added to adjust pH to about 10.5 and the composition is stirred for about 20 minutes. The composition is then allowed to set for about 10 minutes. It is then heated to 200° F. for about 40 hours. At about the sixteenth hour of the heating, it is mixed for about 1 minute, allowed to set for about 5 minutes, and then rheology-tested. In the table below, the results are shown and compared with the results at 0 hours (from Example 1) and 40 hours (from Example 2) for compositions prepared using the same proportions and methodology.

| | Time | | |
|---|---|---|---|
| | 0 hrs. (Ex. 1) | 16 hrs. | 40 hrs. (Ex. 2) |
| Yield Point | 195 | 194 | 135 |
| Plastic Viscosity | 20 | 11 | 10 |
| 6 RPM Reading | 96 | 115 | 80 |
| 3 RPM Reading | 72 | 90 | 65 |

EXAMPLE 9

The procedure of Example 8 is followed except that the heating is done at 250° F. The results are as follows:

| | Time | | |
|---|---|---|---|
| | 0 hrs. | 16 hrs. | 40 hrs. |
| Yield Point | 176 | 26 | 12 |
| Plastic Viscosity | 27 | 14 | 13 |
| 6 RPM Reading | 80 | 4 | 3 |
| 3 RPM Reading | 65 | 2 | 2 |

EXAMPLE 10

A composition is prepared as in Example 8, except that "Starpack II-grade P-3228", a carboxymethylated starch fluid loss prevention additive sold by Chemstar Corporation, is also added following the 20-minute stirring. The composition is then mixed for an additional 15 minutes. The final composition is allowed to set for 10 minutes and then a portion is heated for 40 hours at 200° F. and, following the procedure used in Example 8, rheology is tested at 16 hours and at 40 hours. In the table below the results are compared with the results of testing of a very similar composition as prepared in Example 3, except that a slightly different fluid loss prevention additive is used in that Example.

| | Time | | |
|---|---|---|---|
| | 0 hrs. (Ex. 3) | 16 hrs. | 40 hrs. |
| Yield Point | 69 | 81 | 70 |
| Plastic Viscosity | 17 | 31 | 36 |
| 6 RPM Reading | 68 | 76 | 60 |
| 3 RPM Reading | 65 | 73 | 58 |

EXAMPLE 11

Another portion of the composition prepared for Example 10 is heated for 40 hours, but at 250° F., rather than at 200° F. as in that Example. Testing results for this portion are as follows:

| | Time | | |
|---|---|---|---|
| | 0 hrs. | 16 hrs. | 40 hrs. |
| Yield Point | 64 | 53 | 46 |
| Plastic Viscosity | 16 | 31 | 27 |
| 6 RPM Reading | 67 | 32 | 30 |
| 3 RPM Reading | 63 | 28 | 27 |

EXAMPLE 12

A drilling mud is prepared as in Example 8, using 0.45 lb of calcined HTC-GL ("unwashed") material and 0.15 g of aluminum oxide hydroxide. Proportions of clay, sodium carbonate and sodium hydroxide are the same as in that Example. Following stirring for 20 minutes, the mud is allowed to set for 10 minutes and then rheology is tested. The Example shows test results for portions of mud heated at three different temperatures (200° F., 250° F. and 275° F.) and procedures immediately preceding testing at each step are as described in Example 8.

| | Time at 200° F. | | |
|---|---|---|---|
| | 0 hrs. | 16 hrs. | 40 hrs. |
| Yield Point | 145 | 155 | 145 |
| Plastic Viscosity | 17 | 12 | 16 |
| 6 RPM Reading | 65 | 70 | 60 |
| 3 RPM Reading | 60 | 65 | 50 |
| | Time at 250° F. | | |
| | 0 hrs. | 16 hrs. | 40 hrs. |
| Yield Point | 152 | 117 | 105 |
| Plastic Viscosity | 19 | 8 | 9 |
| 6 RPM Reading | 70 | 40 | 28 |

-continued

|  | | | |
|---|---|---|---|
| 3 RPM Reading | 64 | 35 | 25 |

| | Time at 275° F. | | |
|---|---|---|---|
| | 0 hrs. | 16 hrs. | 40 hrs. |
| Yield Point | 155 | 32 | 28 |
| Plastic Viscosity | 15 | 13 | 12 |
| 6 RPM Reading | 75 | 25 | 18 |
| 3 RPM Reading | 70 | 22 | 17 |

EXAMPLE 13

A drilling mud is prepared as in Example 8, but using about 0.25 lb per barrel (ppb) of calcined HTC-GL ("unwashed") material, about 5.5 ppb of sodium bentonite clay, and about 0.15 ppb of sodium carbonate. The pH is adjusted as in that Example, using a 30 percent aqueous sodium hydroxide solution, and the methodology of preparation is the same. Shear rate and viscosity are measured simultaneously to determine the shear thinning, or stress-dependent fluidity, characteristics of the composition, and recorded in the table below.

| RPM | sec-1 | dial reading | viscosity multiplier | cps |
|---|---|---|---|---|
| 1200 | 2040 | 84 | 0.25 | 21 |
| 600 | 1020 | 84 | 0.5 | 42 |
| 300 | 510 | 78 | 1 | 78 |
| 100 | 170 | 71 | 3 | 210 |
| 6 | 10.2 | 58 | 50 | 2,900 |
| 3 | 5.1 | 57 | 100 | 5,700 |
| 1.5 | 2.55 | 56 | 200 | 11,200 |

When the table results are plotted as a graph in which the vertical axis represents viscosity in centipoise (cps) and the horizontal axis represents shear rate in sec-1, a log scale, and in which units increase in direction away from the origin and are each equidistant and multiplied by a factor of 10 over the preceding unit, the relationship is shown to be substantially linear.

Comparative Example A

About 7.0 g of sodium bentonite clay is mixed with 343 g of water to make a 2.0 weight percent aqueous dispersion. Mixing is carried out using a Hamilton Beach mixer for about 60 minutes, and then 0.15 g of sodium carbonate is added, along with a sufficient amount of a 30 percent by weight aqueous sodium hydroxide solution, to raise the fluid pH to about 10.5. The resulting composition is sheared for an additional 30 minutes.

The composition's rheological and fluid loss properties are tested using standard methodology as described in the previous Examples, with the following results:

| | |
|---|---|
| Yield Point | 4 |
| Plastic Viscosity | 4 |
| 6 RPM Reading | 0 |
| 3 RPM Reading | 0 |

The fluid loss properties of the composition are tested by placing about 300 ml in a standard fluid loss testing apparatus and pressurizing to 100 psig. The discharge fluid is collected for about 30 minutes and found to total 22 ml.

Comparative Example B

A quantity of Alcoa Corporation's "washed" HTC-GL green liquor hydrotalcite slurry is ramp-calcined in a muffle kiln to a temperature of about 1000° C., with the maximum temperature maintained for about 15 minutes and a total ramp time of about 45 minutes. About 0.43 g of this material is mixed with about 350 g of an aqueous 2.0 weight percent sodium bentonite clay dispersion. Mixing is carried out using a Hamilton Beach mixer for about 2 minutes, and then 0. 15 g of sodium carbonate is added, along with a sufficient amount of a 30 percent by weight aqueous sodium hydroxide, solution, to raise the fluid pH to about 10.5. The resulting composition is sheared for an additional 30 minutes. Testing is carried out as described hereinabove, with the following results:

| | |
|---|---|
| Yield Point | 5 |
| Plastic Viscosity | 4 |
| 6 RPM Reading | 1 |
| 3 RPM Reading | 0 |

The fluid loss properties of the composition are tested by placing about 300 ml of it in a standard fluid loss testing apparatus and pressurizing to 100 psig. The discharge fluid is collected for about 30 minutes and found to total 24 ml.

Comparative Example C

A quantity of Alcoa Corporation's "HTC-24", described by the manufacturer as a spray-dried, "washed" hydrotalcite powder, is ramp-calcined in a muffle kiln to a temperature of about 1000° C., with the maximum temperature maintained for about 15 minuted and a total ramp time of about 45 minutes. About 0.43 g of this material is mixed with about 350 g of an aqueous 2.0 weight percent sodium bentonite clay dispersion. Mixing is carried out using a Hamilton Beach mixer for about 2 minutes, and then 0.15 g of sodium carbonate is added, along with a sufficient amount of a 30 percent by weight aqueous sodium hydroxide solution, to raise the fluid pH to about 10.5. The resulting composition is sheared for an additional 30 minutes.

The composition's rheological and fluid loss properties are tested as described in previous Examples, with the following results:

| | |
|---|---|
| Yield Point | 8 |
| Plastic Viscosity | 6 |
| 6 RPM Reading | 1 |
| 3 RPM Reading | 1 |

The fluid loss properties of the composition are tested by placing about 300 ml of it in a standard fluid loss testing apparatus and pressurizing to 100 psig. The discharge fluid is collected for about 30 minutes and found to total 22 ml.

I claim:

1. A rheology modification agent prepared by calcining at a temperature of from about 750° C. to about 1500° C., a material comprising an unwashed waste stream from bauxite processing containing at least Mg, Al, $CO_3$ and OH ions; such that a product is formed, whose constituents substantially conform to the proportions of the empirical formula:

$$M'_m M''_n (OH)_{(2m+3n+qa+br)} (A^q)_a (B^r)_b \cdot xH_2O;$$

wherein M' is Mg and m is an amount of from greater than zero to about 8; where M" is Al and n is an amount of from greater than zero to about 6; wherein A is O and q is −2 and a is an amount from greater than zero to about 3; wherein B is CO$_3$ and r is −2 and b is an amount from zero to about 1; provided qa cannot be greater than or equal to 2m+3n; further provided that (2m+3n+qa+br) is less than 3; and where xH$_2$O represents excess waters of hydration, with x being zero or more; and, optionally thereafter, admixing with said product an aluminum oxide, a nitrogen-containing compound, or a combination thereof.

2. The agent of claim 1 wherein the aluminum oxide is selected from the group consisting of boehmite, gybsite, and amorphous aluminun oxides exhibiting chi or rho orientation.

3. The agent of claim 1 wherein the nitrogen-containing compound is selected from the group consisting of urea, propionamide, acetylamide, thiourea and mixtures thereof.

4. A rheology-modified composition comprising clay; water; and a rheology modification agent of claim 1.

5. The composition of claim 4 wherein the aluminum oxide is selected from the group consisting of boehmite, gybsite, and amorphous aluminum oxides exhibiting chi or rho orientation.

6. The composition of claim 4 wherein the nitrogen-containing compound is selected from the group consisting of urea, propionamide, acetylamide, thiourea and mixtures thereof.

7. The composition of claim 4, 5, or 6, wherein said composition has a pH of from about 9 to 11.

8. The composition of claim 7, wherein the rheology-modified composition is a drilling fluid exhibiting stress-dependent fluidity.

9. A method of preparing a rheology-modified composition comprising mixing clay; water; and a rheology modification agent of claim 1.

10. The method of claim 9 wherein temperature is from about 900° C. to about 1100° C.

11. The method of claim 9 wherein the aluminum oxide is selected from the group consisting of boehmite, gybsite, and amorphous aluminum oxides exhibiting chi or rho orientation.

12. The method of claim 9 wherein the nitrogen-containing compound is selected from the group consisting of urea, propionamide, acetylamide, thiourea and mixtures thereof.

13. The method of claim 9, 10, 11 or 12, wherein said composition has a pH of from about 9 to 11 by adding sodium carbonate or sodium hydroxide thereto.

14. The method of claim 13, wherein first, the clay and water are admixed; second, the rheology modification agent is admixed therewith; third the pH is adjusted to about 9 to about 11.

15. A method of preparing a rheology-modification agent comprising calcining at a temperature of from about 750° C. to about 1500° C., a material comprising an unwashed waste stream from bauxite processing containing at least Mg, Al, CO$_3$ and OH ions; such that a product is formed, whose constituents substantially conform to the proportions of the empirical formula:

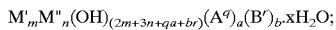

wherein M' is Mg and m is an amount of from greater than zero to about 8; where M" is Al and n is an amount of from greater than zero to about 6; wherein A is O and q is −2 and a is an amount from greater than zero to about 3; wherein B is CO$_3$ and r is −2 and b is an amount from zero to about 1; provided qa cannot be greater than or equal to 2m+3n; further provided that (2m+3n+qa+br) is less than 3; and where xH$_2$O represents excess waters of hydration, with x being zero or more; and, optionally thereafter, admixing with said product an aluminum oxide, a nitrogen-containing compound, or a combination thereof.

16. The method of claim 15 wherein the temperature is from about 900° C. to about 1100° C.

17. The method of claim 15 wherein the aluminum oxide is selected from the group consisting of boehmite, gybsite, and amorphous aluminum oxides exhibiting chi or rho orientation.

18. The method of claim 15 wherein the nitrogen-containing compound is selected from the group consisting of urea, propionamide, acetylamide, thiourea and mixtures thereof.

* * * * *